UNITED STATES PATENT OFFICE.

JOHN T. DURKEE, OF PORTLAND, OREGON.

FIRE-PROOF PAINT.

SPECIFICATION forming part of Letters Patent No. 434,556, dated August 19, 1890.

Application filed October 24, 1889. Serial No. 328,053. (Specimens.)

*To all whom it may concern:*

Be it known that I, JOHN T. DURKEE, a citizen of the United States, residing at the city of Portland, Multnomah county, and State of Oregon, have invented a new and useful Composition of Matter to be Used as a Fire-Proof Roof-Paint, of which the following is a specification.

Heretofore the composition of such paint consisted of a mixture of gas-tar and asbestus with asphaltum, gypsum, Portland cement, and sand. The objection to this composition is that it does not mix perfectly, as the asphaltum, gypsum, Portland cement, and sand settle too rapidly and cannot be applied on the roof in a thoroughly-mingled condition. To remedy this, I substitute for the last-named ingredients clay. With this substance I use gas-tar and asbestus in the following proportions: gas-tar, fifty gallons; asbestus, fifty pounds; powdered clay, twenty-five pounds. These ingredients are to be thoroughly mingled, and when to be used are to be heated to boiling, stirred well, and applied to the roof while still hot in the same manner as an ordinary paint. The ingredients of this composition will mix perfectly, and such composition is entirely free from the objections to be met with in the old composition.

A very fine quality of clay, and which I prefer to use in my composition, is a clay found in Kingman, Kingman county, State of Kansas, known as "Cherokee" or "Kingman brown mineral paint," the main ingredients of which upon analysis were found to be: silica, about forty-four per cent.; alumina, about seventeen per cent.; ferric oxide, about twelve per cent., and magnesia.

Now, what I claim as my invention, and desire to secure by Letters Patent, is—

The herein-described composition of matter to be used as a fire-proof roof-paint, consisting of gas-tar, asbestus, and clay, in the proportions as specified.

Dated at Portland, Oregon, October 17, 1889.

JOHN T. DURKEE.

Witnesses:
   J. J. TIERNEY,
   WILLIAM FELDMAN.